United States Patent [19]

Heim

[11] 4,345,151

[45] Aug. 17, 1982

[54] ARRANGEMENT FOR DETERMINING A MEDIUM

[75] Inventor: Ulrich Heim, Lübeck, Fed. Rep. of Germany

[73] Assignee: Drägerwerk Aktiengesellschaft, Fed. Rep. of Germany

[21] Appl. No.: 198,819

[22] Filed: Oct. 20, 1980

Related U.S. Application Data

[63] Continuation-in-part of Ser. No. 107,279, Dec. 26, 1979, abandoned.

[30] Foreign Application Priority Data

Dec. 27, 1978 [DE] Fed. Rep. of Germany ....... 2856162

[51] Int. Cl.³ ................................................ G01J 1/00
[52] U.S. Cl. .................................. 250/341; 250/343; 250/351; 378/95
[58] Field of Search ............... 250/343, 351, 355, 354, 250/341, 356

[56] References Cited

U.S. PATENT DOCUMENTS

| 2,486,622 | 11/1949 | White, Jr. | 250/343 |
| 3,180,984 | 4/1965 | Fertig et al. | 250/355 |
| 3,903,422 | 9/1975 | Buhrer | 250/372 |

Primary Examiner—Alfred E. Smith
Assistant Examiner—Carolyn E. Fields
Attorney, Agent, or Firm—McGlew and Tuttle

[57] ABSTRACT

An arrangement for determining a medium by means of a temperature sensor which is kept at a given excess temperature, in which the power to maintain the given excess temperature is determined, which includes a source of measuring radiation, a source of auxiliary radiation and the temperature sensor being exposed to a ray path of the measuring radiation and the auxiliary radiation, and means for generating a signal representative of a property of the medium, such as its absorptive or reflective capacity, its polarization properties, as well as correlative properties derivable therefrom.

11 Claims, 1 Drawing Figure

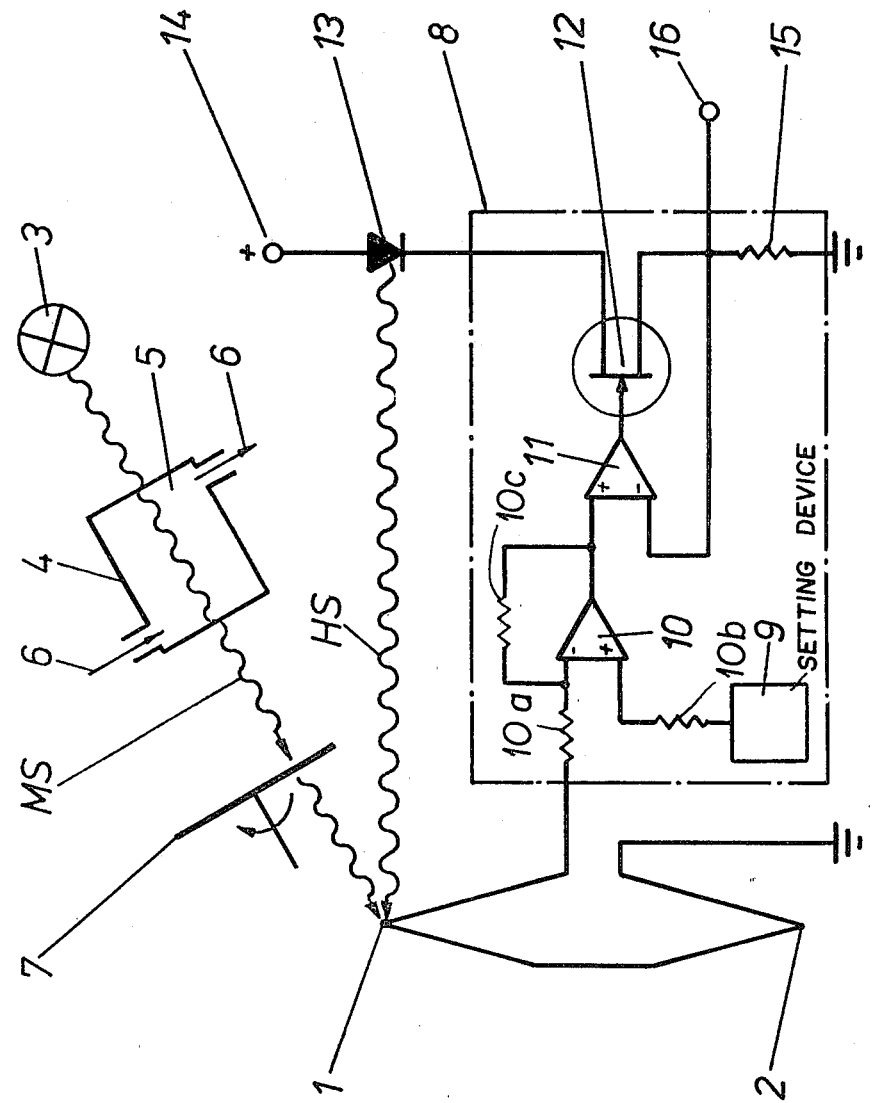

ARRANGEMENT FOR DETERMINING A MEDIUM

This is a continuation-in-part application of application Ser. No. 107,279 filed on Dec. 26th, 1979, now abandoned.

FIELD AND BACKGROUND OF THE INVENTION

This invention relates to an arrangement for determining a medium in general, and, more particularly, to an apparatus and method for determining the properties of a medium, especially a flowing medium.

The known arrangements of radiation detectors with temperature sensors for determining radiation, while having otherwise good properties, such as spectral range sensitivity and ruggedness, have response times which are too slow for such measurements. This is particularly true for the common techniques which use alternating light or filter wheel modulation.

In a known method of monitoring the flow of a medium, a thermistor is adjusted by means of a passing electric current to maintain a working temperature which is above the ambient temperature. A flow stream of the medium is passed over the thermistor. Through a differential amplifier circuit, having a feedback branch, the cooling caused by the flow of the medium with the resulting resistance drop of the thermistor is compensated for by varying the current so that the temperature of the thermistor is kept at a constant value at the working temperature. The power necessary to maintain the constant working temperature is dependent on the flow of the medium and is monitored by means of an indicator. A disadvantage of this method is that high temperatures in the range of about 200° C. are required in order to shorten the reaction time of the thermistor, thereby limiting the range of application and requiring protective measures. (See Swiss Pat. No. 549,218).

SUMMARY OF THE INVENTION

The object of the present invention is to provide an arrangement for determining a property of a medium, which is simple and safe to operate and which is applicable to a wide spectrum of media to be measured.

It is a further object of the invention to provide an apparatus for determining the properties of a medium, particularly a flowing medium, which includes, in combination, a sensor thermally responsive to radiation to produce an output voltage corresponding to a temperature thereof, first radiation means for producing a first ray path of measuring radiation, second radiation means for producing a second ray path of auxiliary radiation, a guide member disposed in the ray path of the measuring radiation between the first radiation means and the sensor for guiding the medium through the ray path of the measuring radiation, the sensor being disposed to receive the measuring radiation and the auxiliary radiation, radiation interrupter means movably mounted adjacent the ray path of the measuring radiation which is operative to periodically intercept at least part of the measuring radiation in the first ray path of measuring radiation and to alternately vary the value of the output voltage to produce a first value and a second value of said auxiliary radiation, and control means interconnecting the sensor and the second radiation means which is operative responsive to the output voltage to produce an output signal from which a determination of a property of the medium can be derived. In a preferred embodiment of the inventive arrangement, the auxiliary radiation means is a light-emitting diode and the sensor is a thermal contact of a thermal couple.

In accordance with the invention, a method for determining the properties of a medium, particularly a flowing medium, includes passing measuring radiation through the medium, producing an auxiliary radiation, exposing a sensor thermally responsive to radiation for producing an output voltage corresponding therewith to the measuring radiation and the auxiliary radiation, periodically intercepting at least part of the measuring radiation to alternately vary the value of the output voltage, and passing the output voltage through a control circuit to produce an output signal such that a determination of a property can be derived.

The inventive arrangement and method may be employed to determine the properties of a media including, for example, its absorptive or reflective capacity, its polarization properties, as well as correlative properties derivable therefrom such as the concentration of a substance on the basis of its absorption.

The use of radiation for determining media is known. These methods have the disadvantage that the temperature sensors used as radiation detectors, which are otherwise simple and safe to operate, respond too slowly to rapidly changing signal variations. With the arrangement of the invention, this sluggishness is eliminated.

The measured value is a function of the difference of the radiation efficiency between the dark and the light value of the auxiliary radiation. The required energizing power E, which is needed to keep the temperature sensor at an excess temperature, above the temperature of the working medium, is the measuring value which determines the medium property value.

It is a further object of the present invention to provide an arrangement for determining the properties of a medium which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The sole FIGURE of the drawing is a schematic representation of an arrangement for determining the properties of a medium, in accordance with the present invention.

DESCRIPTION OF THE PREFERRED EMBODIMENT

Referring to the drawing in particular, the invention embodied therein, comprises, an arrangement for determining a property of a medium by means of a thermal sensor which is kept at an oven-temperature. As seen in the drawing, temperature sensor 1 is a thermocontact of a thermocouple which has another thermocontact at ambient temperature. Temperature sensor 1 is exposed to a measuring radiation MS from a measuring radiation source 3. In the path of rays emanating from the measuring source 3, a guide 4 for guiding the passage of a medium 5 and a radiation interrupter 7 are arranged. The medium 5 flows through the guide 4 in the direction of arrows 6. Radiation interrupter 7 interrupts the measuring radiation MS periodically. A known type of interrupter capable of interrupting the measuring radiation may be used as radiation interrupter 7, for example, a filter wheel. The temperature sensor 1 is also constantly exposed to an auxiliary radiation HS emanating from an auxiliary radiation source 13, such as a light-emitting diode. Due to the exposure to the measuring radiation MS and the auxiliary radiation HS, the temperature sensor 1 is kept at a given excess temperature. The total radiation S thus generally consists of the measuring radiation MS and of the auxiliary radiation HS, that is $$MS + HS = S$$

During the interruption of the measuring radiation MS by radiation interrupter 7, the auxiliary radiation HS assumes the dark value $HS_d$ which corresponds to the total radiation S $$HS_d = S$$

During the release of the measuring radiation MS by radiation interrupter 7, the auxiliary radiation assumes the light value $HS_h$. The total radiation is thus $$S = MS + HS_h$$

With the value of the dark value $HS_d$, we have thus derived that the value of the measuring radiation is definable as a function corresponding to $$MS = HS_3 - HS_h$$

The dark value $HS_d$ requires the energizing power $E_d$ while the light value $HS_h$ requires the energizing power $E_h$. Corresponding current values, $I_d$ and $I_h$, which are required to energize the auxiliary radiation source 13, can also be utilized. By accounting for the proportionality factor, alpha ($\alpha$), between energizing power E and the resulting radiation capacity HS, we obtain from $$MS = HS_3 - HS_h,$$

that the measuring radiation HS is $$MS = \alpha(E_d - E_h) = \alpha(I_d - I_h).$$

Under the excess temperature of temperature sensor 1, a thermoelectric voltage output is formed relative to thermocontact 2. The thermoelectric voltage output is fed into a control circuit 8. The thermoelectric voltage output together with a reference voltage obtained from a setting means 9 is fed from a tap of sensor 1 and setting means 9 through, respectively, resistors 10a and 10b to the negative and positive inputs of a first differential operational amplifier 10, whose output drives a field effect transistor 12 through a second differential operational amplifier 11. A feedback resistor 10c is connected between the output and negative input terminal.

The field effect transistor 12 determines the current $I_d$ or $I_h$ flowing through auxiliary radiation source 13. The field effect transistor 12, as illustrated in the drawing, includes a base electrically connected to the output of the second differential operational amplifier 11, a collector electrically connected to the auxiliary radiation source or diode 13, and an emitter electrically connected to a signal output 16 and a precision resistor 15.

Auxiliary radiation source 13 is supplied with voltage over a terminal 14. A voltage drop is established across the precision resistor 15 which is proportional to the current $I_d$ and $I_h$, and which can be tapped at signal output 16 for further processing. Auxiliary radiation source 13 is preferably a semi-conductor, light-emitting diode in the form of a gallium arsenide (GaAS) diode with emission in the near IR at 1 $\mu$m. The emission of the auxiliary radiation HS is so controlled by control circuit 8 that a certain voltage difference between the reference voltage and the thermoelectric voltage is maintained at the differential input of the first operational amplifier under its action on temperature sensor 1, which corresponds to the desired excess temperature of detector 1. A value for the measuring radiation (MS) is ascertained from the difference between the current magnitudes, $I_d$ and $I_h$, that is, between the dark and light conditions. The value of measuring radiation (MS) can be transmitted in a known manner over signal output 16 and be displayed in an indicator (not shown).

As shown in the FIGURE, the inventive apparatus for determining the properties of the medium is provided with a control circuit 8 which includes a setting device 9 for producing a reference voltage, a first resistor 10a, a second resistor 10b, a first differential operational amplifier 10 having a negative input, a positive input, and an output. The first resistor 10a is connected between said sensor 1 and said negative input and the second resistor 10b is connected between the setting device 9 and the positive input of said first differential operational amplifier 10. The circuit 8 further includes an output signal terminal 16, a second differential amplifier 11 having a negative input, a positive input, and an output.

The output of said first differential operational amplifier 10 is connected to the positive input of the second differential operational amplifier 11 and the output signal terminal 16 is connected to the negative input of said second differential operational amplifier. A field effect transistor 12 having a base, a collector and an emitter, is provided in circuit 8. The output of said second differential operational amplifier 11 is connected to the base. The auxiliary radiation source is connected to the collector. The emitter is connected to the circuit line intermediate the output signal terminal and the negative input of the second differential operational amplifier. A third resistor is connected between the junction of the emitter with the aforementioned circuit line and ground.

While a specific embodiment of the invention has been shown and described in detail to illustrate the application of the principles of the invention, it will be understood that the invention may be embodied otherwise without departing from such principles.

What is claimed is:

1. An arrangement for determining a property of a medium, by means of a temperature sensor which is kept at a given excess temperature, in which the power necessary to maintain the given excess temperature is determined, comprising, a source of measuring radiation (MS), a source of auxiliary radiation (HS), the temperature sensor being exposed to a ray path of said measuring radiation (MS) and said auxiliary radiation (HS), a guide arranged in said measuring radiation ray path for the medium and a radiation interrupter for periodically interrupting said measuring radiation, control circuit means for controlling said auxiliary radiation source in dependence given on the temperature of the temperature sensor to maintain the given excess temperature and producing an output signal whereby the value of the measuring radiation (MS) is determined as a function of the values $HS_d$ and from the equation $$MS = HS_d - HS_h,$$

where $HS_3$ and $HS_h$ are the values the auxiliary radiation assumes when the measuring radiation is interrupted and uninterrupted, respectively.

2. The arrangement according to claim 1, wherein the radiation interrupter works according to the alternating light method.

3. The arrangement according to claim 1, wherein the radiation interruptor is a filter wheel.

4. An apparatus for determining a property of a medium, particularly a flowing medium, comprising, in combination:
- a sensor thermally responsive to radiation to produce an output voltage corresponding to the temperature thereof;
- first radiation means for producing a first ray path of a measuring radiation (MS);
- second radiation means for producing a second ray path of auxiliary radiation (HS);
- a guide path member disposed in said ray path of measuring radiation between said first radiation means and said sensor for guiding the medium through said ray path of measuring radiation;
- said sensor being disposed to receive said measuring radiation and said auxiliary radiation;
- radiation interrupter means movably mounted adjacent said ray path of measuring radiation being operative to periodically intercept at least part of said measuring radiation in said ray path of measuring radiation;
- and control circuit means interconnecting said sensor and said second radiation means being responsive to said output voltage to produce an output signal from which a determination of a property of the medium can be derived, said control circuit means operable to vary the second radiation means to maintain said sensor at a selected excess temperature by producing a radiation level ($HS_d$) with said measuring radiation (MS) intercepted and a level ($HS_h$) with said measuring radiation (MS) unintercepted, the property being a function of the value $HS_D - HS_h$.

5. An apparatus according to claim 4, wherein said radiation interrupter means is a filter wheel.

6. An apparatus according to claim 4, wherein said auxiliary radiation means is a light-emitting diode.

7. An apparatus according to claim 4, wherein said sensor is a thermocontact of a thermocouple.

8. An apparatus according to claim 4, wherein said control circuit means includes: setting means for producing a reference voltage; a first resistor; a second resistor; a first differential operational amplifier having a negative input, a positive input, and an output; first circuit means for connecting said first resistor between said sensor and said negative input and said second resistor between said setting means and said positive input of said first differential operational amplifier; an output signal terminal; a second differential operational amplifier having a negative input, a positive input, and an output; second circuit means for connecting said output of said first differential operational amplifier and said second differential operational amplifier positive input, and said output signal terminal with said negative input of said second differential operational amplifier; a field effect transistor having a base, a collector and an emitter; third circuit means for connecting said output of said second differential operational amplifier with said base, said second radiation means with said collector and said second circuit means with said emitter; a third resistor, and fourth circuit means for connecting said third resistor between said second circuit means and ground.

9. An apparatus according to claim 8, wherein said second radiation means is a light-emitting diode.

10. An apparatus according to claim 9, wherein said sensor is a thermocontact of a thermocouple, said thermocouple having a second thermocontact exposed to a reference temperature.

11. A method of determining a property of a medium which varies with the absorption of radiation in the medium, particularly a flowing medium comprising:
- radiating a thermal sensor with a measuring radiation after the measuring radiation has passed through the medium;
- exposing the thermal sensor to an auxiliary radiation from an auxiliary radiator;
- periodically interrupting the measuring radiation after it has passed through the medium and before it strikes the thermal sensor;
- varying the radiation from the auxiliary radiator so that the thermal sensor is always heated to a selected excess temperature with said measuring radiation interrupted and uninterrupted by varying the current passing through said auxiliary radiatior;
- measuring the difference between current passing through the auxiliary radiator when the measuring radiation is interrupted and when the measuring radiation is uninterrupted; and
- using the difference in current as a measure which is proportional to the property of the medium to be measured.

* * * * *